(12) United States Patent
Suto

(10) Patent No.: US 8,409,751 B2
(45) Date of Patent: Apr. 2, 2013

(54) ELECTROCHEMICAL DEVICE

(75) Inventor: Daisuke Suto, Tokyo (JP)

(73) Assignee: TDK Corporation, Tokyo (JP)

( * ) Notice: Subject to any disclaimer, the term of this patent is extended or adjusted under 35 U.S.C. 154(b) by 949 days.

(21) Appl. No.: 12/400,318

(22) Filed: Mar. 9, 2009

(65) Prior Publication Data
US 2009/0239142 A1 Sep. 24, 2009

(30) Foreign Application Priority Data

Mar. 18, 2008 (JP) .................................. 2008-069934

(51) Int. Cl.
*H01M 2/02* (2006.01)
*C25B 9/00* (2006.01)
(52) U.S. Cl. ........ 429/177; 429/129; 429/149; 429/153; 429/156; 204/242
(58) Field of Classification Search .......... 429/123–187; 204/242
See application file for complete search history.

(56) References Cited

U.S. PATENT DOCUMENTS
6,743,546 B1 * 6/2004 Kaneda et al. ................ 429/127

FOREIGN PATENT DOCUMENTS
| JP | A-11-167930 | 6/1999 |
| JP | A-2005-302501 | 10/2005 |
| JP | A-2006-339032 | 12/2006 |
| WO | WO 2007/072660 A1 | 6/2007 |

OTHER PUBLICATIONS

WO 2007/072660 (machine translation).*
Japanese Office Action issued in Application No. 2008-069934; Drafted Mar. 29, 2010.

* cited by examiner

*Primary Examiner* — Patrick Ryan
*Assistant Examiner* — Alex Usyatinsky
(74) *Attorney, Agent, or Firm* — Oliff & Berridge, PLC

(57) ABSTRACT

This electrochemical device includes a first frame, a second frame, and a laminated electrochemical element having a housing encasing an element. Outer edges of the housing are sandwiched between the first frame and the second frame. Hook members are provided on one of the first frame and the second frame, and indentations engaging the hook members are provided on the other one of the frames, thereby fixing the relative positional relationship between the first frame and the second frame.

3 Claims, 8 Drawing Sheets

ELECTROCHEMICAL DEVICE

BACKGROUND OF THE INVENTION

1. Field of the Invention

The present invention relates to an electrochemical device comprising a laminated electrical element.

2. Related Background Art

Known conventional laminated electrochemical elements include laminated batteries and electric double-layer capacitors. For example, Japanese Patent Application Laid-open Publication No. 1999-167930) discloses a laminated battery. A laminated battery has a battery element having a laminated structure, a laminated sheet (film-like package) sealing the inside of the battery element, and a tab terminal (electrode) extending from the battery element to an outside of the laminated sheet to make the battery element electrically connectable to the outside. In addition, it has been suggested that a plurality of laminated batteries be stored and protected inside of a box (Japanese Patent Application Laid-open Publication No. 2006-339032).

However, a laminated electrochemical element has low mechanical strength, and there is a risk that the element will be damaged when handled as a unit.

SUMMARY OF THE INVENTION

The present invention was devised with such problems in view and it is an object of the present invention to provide an electrochemical device comprising a laminated electrical chemical element and capable of preventing this damage.

In order to solve the above-mentioned problem, the electrochemical device of the present invention comprises a first frame, a second frame, and a laminated electrochemical element having a housing encasing an element. An outer edge of the housing is sandwiched between the first frame and the second frame, and the relative positional relationship between the first frame and the second frame is fixed.

According to this electrochemical device, since the outer edge of the housing is sandwiched between the first frame and the second frame, and since the positional relationship between the first frame and the second frame is fixed, the frames protect the laminated electrochemical element and can prevent damage thereof.

Furthermore, preferably a hook member is provided on one of the first frame and the second frame, an indentation engaging the hook member is provided on the other one of the frames, and the relative positional relationship between the first frame and the second frame is thereby fixed by the hook. The present invention therefore has the advantage of being easy to produce because the first frame and the second frame are fixed simply by inserting the hook members into the indentations, and also has the advantage of being lightweight because the structure is simple and fixed.

Preferably, the first frame has first and second surfaces extending along two parallel axes respectively and bent around the aforementioned axes respectively, the second frame has third and fourth surfaces opposing the first and second surfaces, respectively, a portion of the outer edge of the housing interposes between the first and third surfaces, and another portion of the outer edge of the housing interposes between the second and fourth surfaces.

Peripheral portions of the housing are sandwiched by the first and third surfaces and by the second and fourth surfaces and are each thereby bent around one axis, providing the advantage that when the outer edges are sandwiched by the frames, damage does not easily occur because the outer edges are bent by the frames, and also providing the advantage that bends, each extending along one axis, improve the strength in the direction perpendicular to the aforementioned axis of the housing itself.

Furthermore, preferably the first frame comprises a pair of raised portions protruding in the thickness direction, one end of the housing abuts the surfaces of both raised portions, and foil-like tab electrodes extending from one end of the housing pass through a space between the raised portions and are electrically connected to output terminal electrodes fixed to the first frame.

Since the tab electrodes are foil-like, they can absorb positional changes of the housing caused by thermal expansion and thermal contraction, and physical severance of the tab electrodes due to such thermal deformation can thereby be prevented. However, the tab electrodes are not easy to position since they are foil-like and thus flexibly deform. According to the device of the present invention, the housing is positioned with one end of the housing abutting side surfaces of the raised portions, and furthermore, foil-like tab electrodes extending from the housing are precisely positioned between these raised portions, enabling the tab electrodes to be precisely connected to the output terminal electrodes.

By the electrochemical device of the present invention, damage to the laminated electrochemical element can be prevented.

DESCRIPTION OF THE PREFERRED EMBODIMENTS

A preferred embodiment of the electrochemical device of the present invention will be described below with reference to the attached figures. Also, in the descriptions of the figures, the same symbols are used for identical or equivalent elements, and redundant descriptions are omitted.

Figure 1:
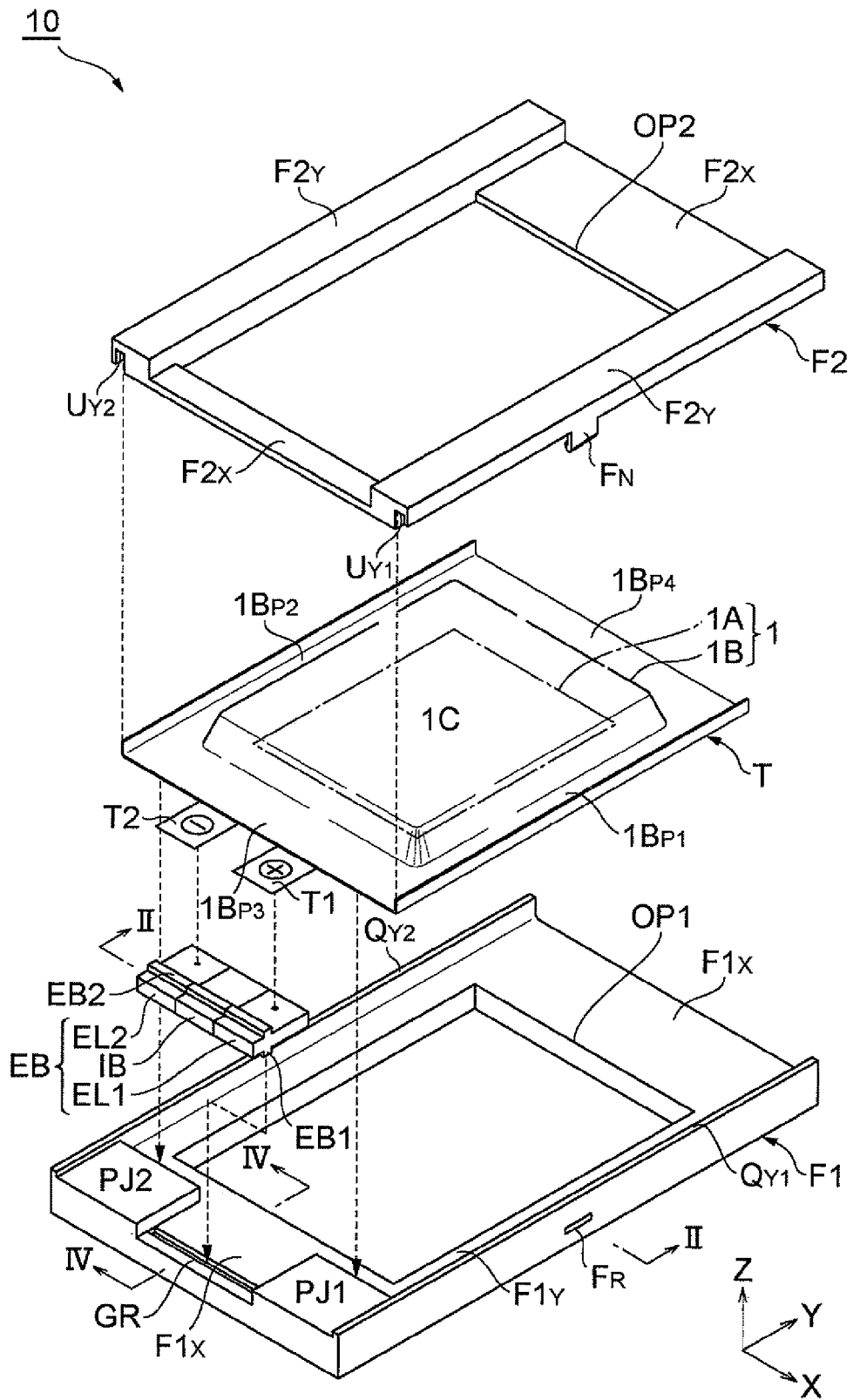
FIG. 1 is a perspective view of a disassembled electrochemical device of a first embodiment.

FIG. 1 is a perspective view of the disassembled electrochemical device of the first embodiment.

This electrochemical device 10 comprises a laminated electrochemical element 1 having a first frame F1 and a second frame F2, each comprising a resin, and a housing 1B encasing an element 1A. The external form of the housing 1B is square, and foil-like tab electrodes T1 and T2 extend from an end T forming a side of the housing 1B. The electrochemical device 10 of the present embodiment is a lithium-ion secondary battery.

Figure 6:
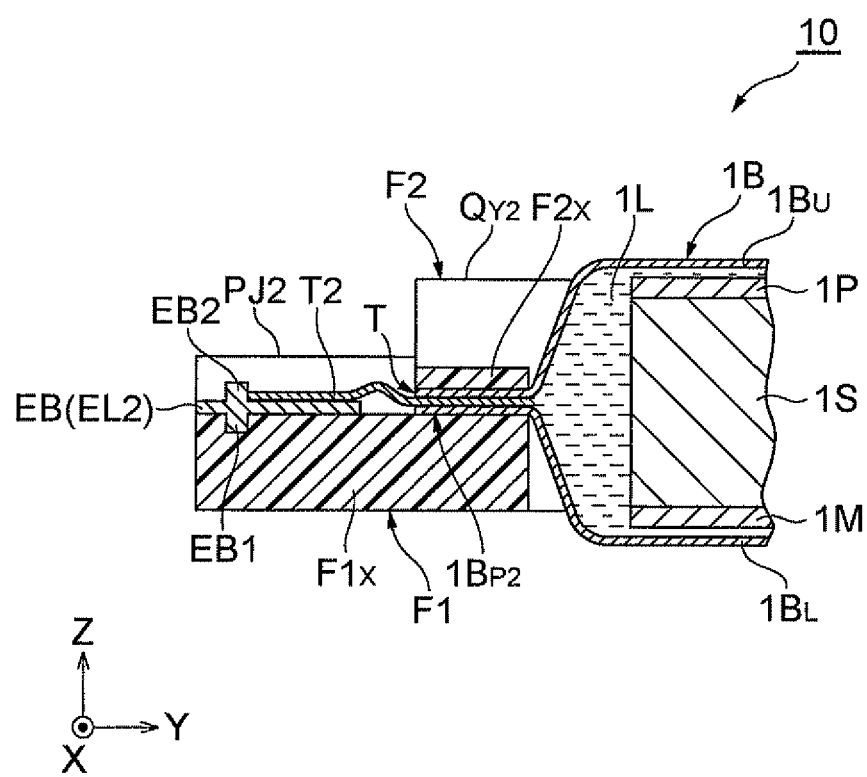
FIG. 6 is a sectional view taken along arrows VI-VI of the electrochemical device of FIG. 1 or FIG. 5.

As shown in FIG. 6, the element 1A arranged on the inside of the housing 1B comprises a positive electrode 1P, a negative electrode 1M, and a separator 1S. The separator 1S comprises a porous body permeable to ions and electrolytes, and the inside of the housing 1B is filled with an electrolyte solution 1L. The housing 1B comprises a square upper film $1B_U$ superimposed on a square lower film $1B_L$, and outer edges of a square region thereof are connected. The housing 1B comprises an aluminum laminated film. One sheet of aluminum laminated film comprises aluminum foil sandwiched by a pair of resin films. A tab terminal electrode T1 (see FIG. 1) for a positive electrode and a tab terminal electrode T2 for a negative electrode are electrically connected to a positive electrode 1P and a negative electrode 1M, respectively, and these electrodes are extended to the outside of the housing 1B.

As shown back in FIG. 1, the outer edges (peripheral parts) $1B_{P1}$ and $1B_{P2}$ of the housing 1B are sandwiched between the first frame F1 and the second frame F2. These outer edges $1B_{P1}$ and $1B_{P2}$ extend along a Y axis. In other words, the outer edges $1B_{P1}$ and $1B_{P2}$ each extend along two axes parallel with the Y axis respectively.

The electrochemical element 1 contains the element 1A, and thus has a central portion 1C thicker than the outer edges, and has edges $1B_{P1}$, $1B_{P2}$, $1B_{P3}$ and $1B_{P4}$ surrounding the center portion 1C. The center of the first frame F1 is provided with a square opening OP1 accommodating the lower portion of the center portion 1C of the housing 1B. The center of the second frame F2 is provided with a square opening OP2 accommodating the upper portion of the center portion 1C of the housing 1B. The edges of openings OP1 and OP2 run along the X axis and Y axis.

The frames F1 and F2 have portions $F1_X$, $F1_Y$, $F2_X$ and $F2_Y$ extending in the X-axis direction and the Y-axis direction, respectively, and the frames F1 and F2 assume square window shapes. Outer edges $1B_{P1}$ and $1B_{P2}$ extending in the Y-axis direction of the outer edges of the housing 1B are sandwiched between the lower surfaces of a pair of portions $F2_Y$ extending in the Y-axis direction of the second frame F2 and the upper surfaces of a pair of portions $F1_Y$ extending in the Y-axis direction of the first frame F1, respectively.

Furthermore, on the outer surfaces located at both ends in the X-axis direction of the pair of portions $F2_Y$ extending in the Y-axis direction of the second frame F2, a pair of hook members $F_N$ are each provided extending along a Z-axis toward the first frame F1. Since indentations $F_R$ accommodating the hook members $F_N$ are provided on the first frame F1, the relative positional relationship between the first frame F1 and the second frame F2 is fixed. The positional relationships between the hook members $F_N$ and the indentations $F_R$ are not limited to the aforementioned, the hook members $F_N$ and the indentations $F_R$ can be provided on the first frame F1 and the second frame F2 in the reverse configuration of the aforementioned or provided on either of the portions $F1_X$ and $F1_X$, and the number of hook members $F_N$ and indentations $F_R$ can be 3 or more each.

The present invention thereby has the advantage of being easy to produce because the first frame F1 and the second frame F2 are fixed simply by inserting the hook members $F_N$ into the indentations $F_R$, and also has the advantage of being lightweight because the structure is simple and fixed.

Furthermore, according to this electrochemical device 10, the outer edges of the housing 1B are sandwiched between the first frame F1 and the second frame F2, and the positional relationships thereof are fixed, and therefore the laminated electrochemical element 1 is protected by frames F1 and F2, and damage to the laminated electrochemical element 1 can be prevented.

The first frame F1 has a pair of raised portions PJ1 and PJ2 provided on an end thereof and protruding in the +Z-axis direction. An end T of the housing 1B is positioned abutting side surfaces on the +Y-axis sides of the raised portions PJ1 and PJ2. In the region between the raised portion PJ1 and the raised portion PJ2 of the first frame F1, groove GR is provided extending along the X axis, and a protruding ridge EB1 of an electrode member EB is fitted into the groove GR.

The electrode member EB comprises a positive output terminal electrode EL1, a negative output terminal electrode EL2, and an insulation member IB intervening therebetween, all integrally fixed, and the aforementioned protruding ridge EB1 extending along an X-axis is formed on the lower surface thereof. Furthermore, a protruding ridge EB2 is formed extending along the X-axis on the upper surface of the electrode member EB, and the tips extending in the -Y-axis direction of the tab electrodes T1 and T2 are equipped in contact with a side surface on the +Y-axial side of the protruding ridge EB2.

The pair of portions $F1_Y$ running along the Y-axis of the first frame F1 each have raised ridges (raised portions) $Q_{Y1}$ and $Q_{Y2}$ provided standing in a +Z-axis direction and extending along the Y-axis. Raised ridges $Q_{Y1}$ and $Q_{Y2}$ fit into indented grooves (indented portions) $U_{Y1}$ and $U_{Y2}$ provided on the lower surface of the second frame F2, respectively, and sandwich the outer edges of the housing 1B.

Next, the structure sandwiching the outer edges of the housing will be explained in detail.

Figure 2:
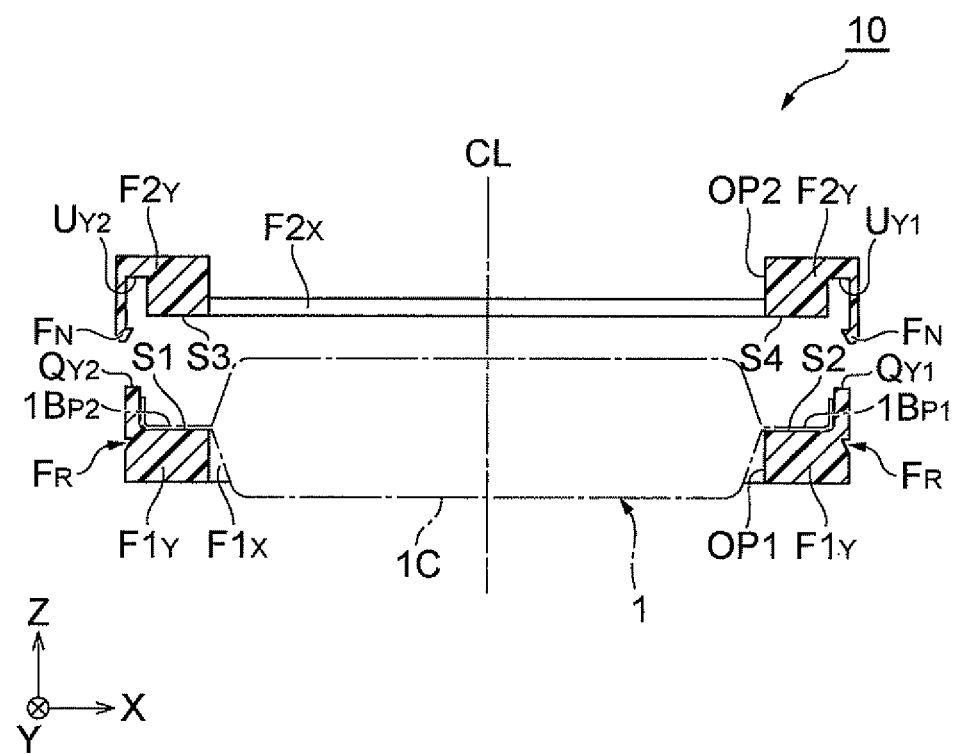
FIG. 2 is a sectional view taken along arrows II-II of the disassembled electrochemical device shown in FIG. 1.
Figure 3:
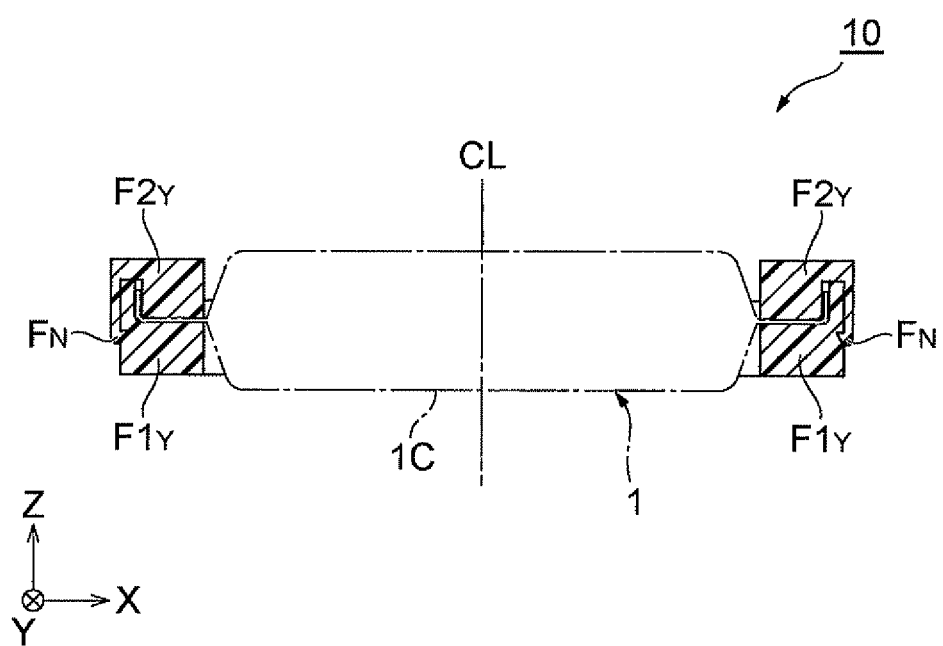
FIG. 3 is a sectional view taken along the arrows II-II of the electrochemical device shown in FIG. 1 after being assembled.

FIG. 2 is a sectional view taken along the arrows II-II of the disassembled electrochemical device shown in FIG. 1, and FIG. 3 is a sectional view taken along the arrows II-II of the assembled electrochemical device shown in FIG. 1.

The shape of the electrochemical device 10 is symmetrical with respect to a YZ plane CL passing through a center thereof. The outer-edge portions $1B_{P1}$ and $1B_{P2}$ of the housing 1B are sandwiched between the upper surfaces of the pair of portions $F1_Y$ of the first body F1 and the lower surfaces of the pair of portions $F2_Y$ of the second frame F2, respectively, and these outer-edge portions $1B_{P1}$ and $1B_{P2}$ are each bent around a Y-axis and are bent in the +Z-axis direction. Portions belonging to outer edges $1B_{P1}$ and $1B_{P2}$ and extending in a +Z-axis direction are positioned inside the indented grooves $U_{Y1}$ and $U_{Y2}$ and are sandwiched between the inner surfaces of the raised ridges $Q_{Y1}$ and $Q_{Y2}$ and the inner surfaces of the indented grooves $U_{Y1}$ and $U_{Y2}$. Furthermore, the electrochemical element 1 is slightly thicker in the Z-axis direction than the frames assembled together.

Figure 4:
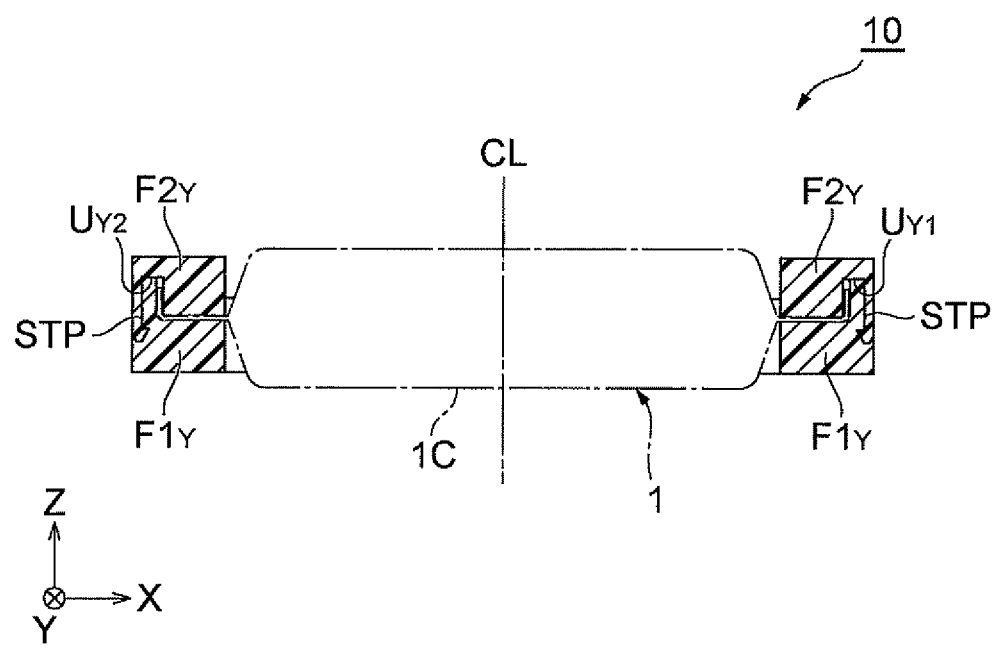
FIG. 4 is a sectional view of a frame structure in a modification.

FIG. 4 is a sectional view of the frame structure of an alternative embodiment.

In FIG. 3, the hook members $F_N$ are positioned on the outer side of the outer surface of the first frame F1 in the X-axis direction, but in the present embodiment, inwardly indented terraced surfaces STP are provided on the outer surfaces of both ends of the first frame F1 in the X-axis direction for the side walls on the outer side of the indented grooves $U_{Y1}$ and $U_{Y2}$ to fit into. Since the shape of the present invention is formed by the correspondence of the positions of the outer surfaces of the hook members $F_N$, the outer surfaces of the side walls of the indented grooves $U_{Y1}$ and $U_{Y2}$, and the outer surfaces of both ends of the first frame F1 in the X-axis direction, the present invention is easy to handle and can be miniaturized somewhat.

Figure 5:
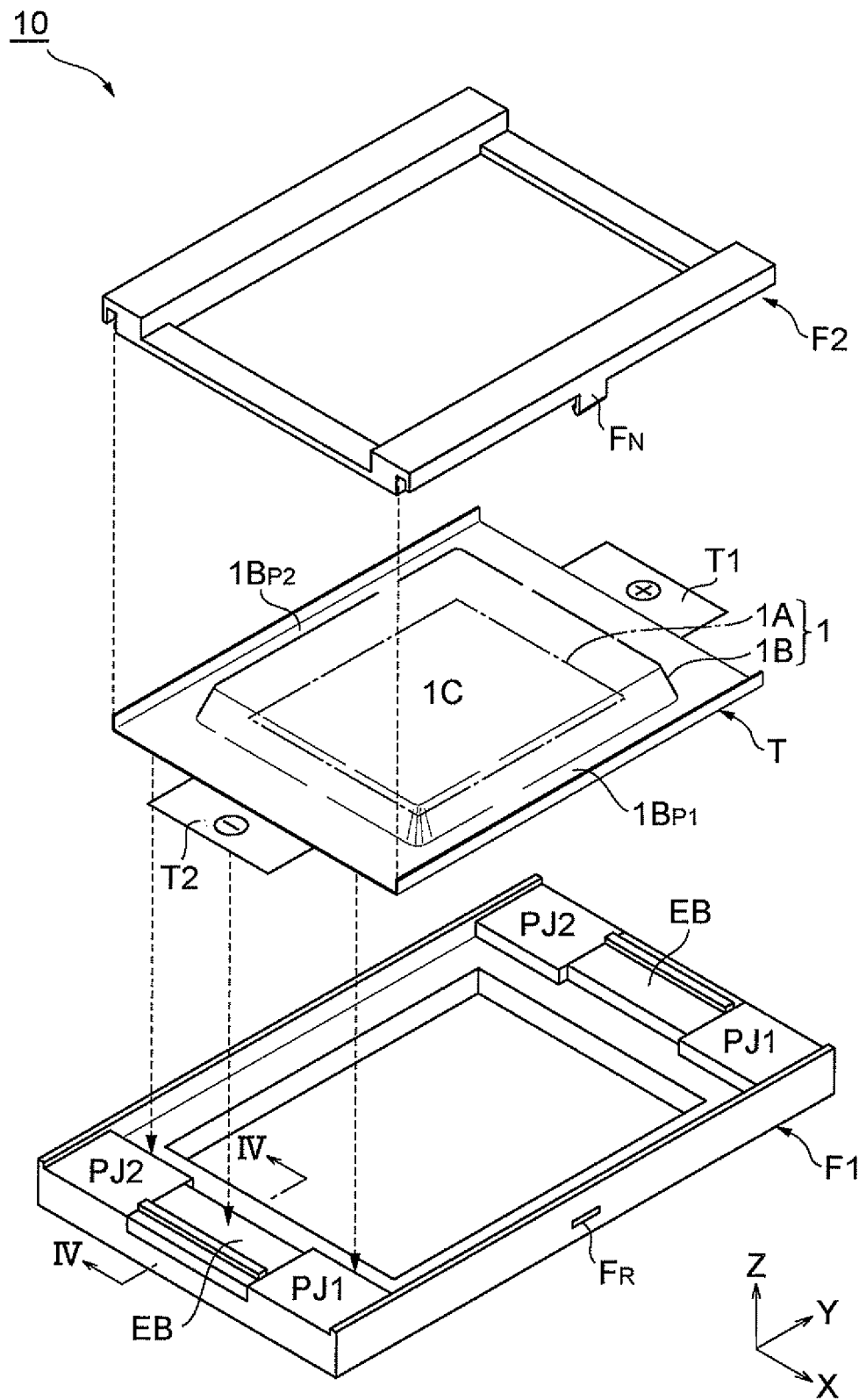
FIG. 5 is a perspective view of a disassembled electrochemical device of a second embodiment.

FIG. 5 is a perspective view showing the disassembled electrochemical device of the second embodiment.

In the present embodiment, the positions differ between the tab electrodes T1 and T2 extending from the laminated electrochemical element 1. That is, the tab electrode T1 extends from the end T in the +Y-axis direction and the tab electrode T2 extends from the end T of the −Y-axis direction of the housing 1B. The tab electrode T2 passes through the region between the raised portions PJ1 and PJ2 located in the −Y-axis direction and is electrically connected to the electrode member (output terminal electrode) EB comprising a metal material. The tab electrode T1 passes through the region between the raised portions PJ1 and PJ2 located in the +Y-axis direction and is electrically connected to the electrode member EB comprising a metal material.

The structure of the electrode member EB is identical to the structure of the electrode member EB shown in FIG. 1, other than comprising only a conductive material, and furthermore, the structure of this element is symmetrical with respect to the XZ plane passing through the center of the electrochemical device. Furthermore, the rest of the structure is identical to the structure described in the first embodiment. In particular, the structure of the sectional view taken along arrows VI-VI is identical to the structures in FIG. 1 and FIG. 5. The structure of the sectional view taken along the arrows VI-VI is symmetrical with respect to the YZ plane passing through the center of the device. The structure of this portion will be described in detail.

FIG. 6 is a sectional view along the arrows VI-VI of the electrochemical device shown in FIG. 1 and FIG. 5. FIG. 1 and FIG. 5 will also be referenced as necessary. As mentioned above, the first frame F1 comprises a pair of raised portions PJ1 and PJ2 protruding in the thickness direction (+Z-axis direction), and the ends T of the housing 1B abut the side surfaces of the pairs of raised portions PJ1 and PJ2. The foil-like tab electrode T2 (T1) extending from the end T of the housing 1B passes through the space between the raised portions PJ1 and PJ2 and is electrically connected to the electrode member EB (EL2, EL1) fixed to the first frame F1.

Since the tab electrode T2 (T1) is foil-like, it can absorb positional changes of the housing 1B caused by thermal expansion and thermal contraction, and physical severance of the tab electrode T2 (T1) due to such thermal deformation can thereby be prevented, but the tab electrode is not easy to position since it is foil-like and flexibly deforms. According to this device, the housing 1B is positioned with the end T of the housing 1B abutting a side surface of the raised portion PJ2 (PJ1), and furthermore, the foil-like tab electrode T2 (T1) extending from the housing 1B is precisely positioned between the raised portions, and the tab electrode T2 (T1) can thereby be precisely connected to the electrode member EB (EL2, EL1). Furthermore, these tab electrodes and output terminal electrodes can be electrically connected using ultrasonic welding and can also be connected using solder and the like.

Moreover, in the present embodiment, the portion $F2_X$ of the end, in the −Y-axis direction, of the second frame F2 located at the top of the figure abuts the side surfaces of the raised portions PJ1 and PJ2, enabling the first and second frames F1 and F2 to easily be positioned. In addition, the surface of the tab electrode T2 (T1) is exposed. This structure has the cost advantages that the tab electrode T2 (T1) can be electrically connected after assembling the frames together and that only a small quantity of frame material is necessary.

Figure 7:
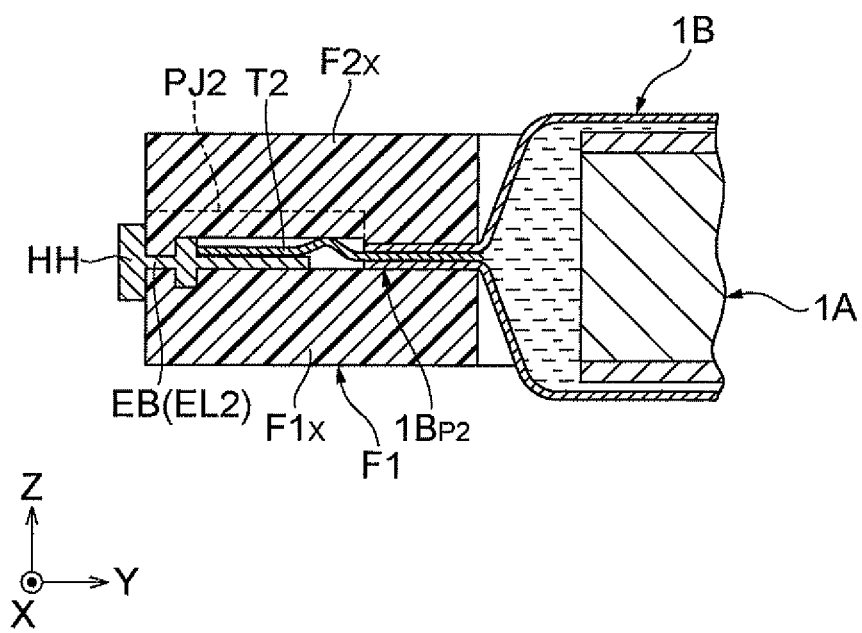
FIG. 7 is a sectional view of the structure of a vicinity of an output terminal in a modification.

FIG. 7 is a sectional diagram of the structure of the vicinity of the output terminal of an alternative embodiment.

By the present embodiment, the second frame F2 is also positioned on top of the tab electrode T2 (T1), and has a function of protecting the same.

The portion $F2_{X'}$ of the end in the −Y-axis direction of the second frame F2 is thicker than the portion $F2_X$ mentioned above and covers the tab electrode T2 (T1) and the electrode member EB. The part of the portion $F2_X$ opposing the raised portion PJ2 (PJ1) is indented and can abut the side surface of the raised portion PJ2 (PJ1). Furthermore, the electrode member EB projects toward the outside of the end part in the −Y-axis direction of frames F1 and F2, forms a T-shape in the YZ plane, and has an exposed portion HH exposed outside. Electrical connection of the exposed portion HH from the outside is easy.

Figure 8:
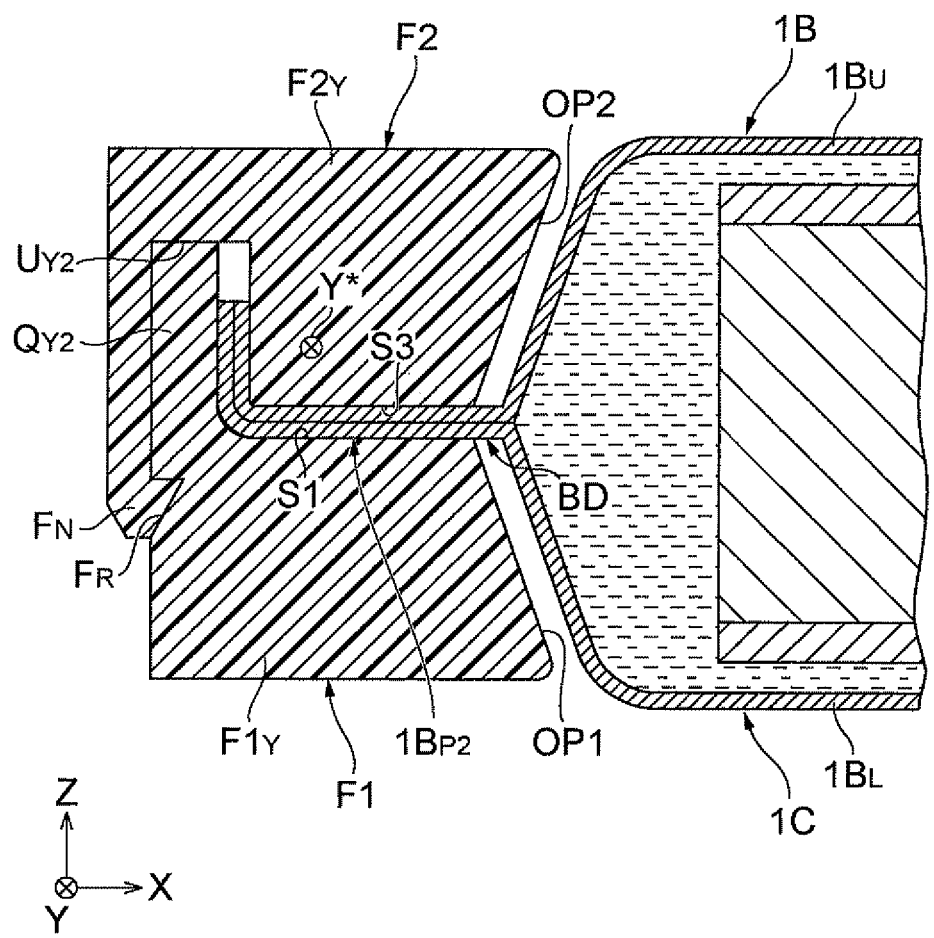
FIG. 8 is a sectional view of a frame structure in a modification.

FIG. 8 is a sectional view of the frame structure of an alternative embodiment.

As mentioned above, since this device is symmetrical with respect to the YZ plane passing through the center thereof the structure of only one side will be described. The first frame F1 has a first surface S1 and a second surface S2 (see FIG. 2) extending along two parallel axes Y* (only one shown in the figure) respectively, and the first surface S1 and the second surface S2 are each bent around one axis Y*.

Furthermore, the second frame F2 has a third surface S3 and a fourth surface S4 (see FIG. 2) opposing the first surface S1 and the second surface S2, respectively, a portion $1B_{P2}$ of an outer edge of the housing 1B interposes between the first surface S1 and the third surface S3, and another portion $1B_{P1}$ (see FIG. 2) of the outer edge of the housing 1B interposes between the second surface S2 and the fourth surface S4.

The peripheral portions of the housing 1B are sandwiched by the first surface S1 and the third surface S3 and by the second surface S2 and the fourth surface S4 and are each thereby bent around 1 axis Y* (Y axis). In the present embodiment, the bent portion of the outer edge has a suitable curvature radius. This configuration provides the advantage that when the outer edges are sandwiched by the frames F1 and F2, damage does not easily occur because the outer edges are bent by the frames F1 and F2, and also provides the advantage that the bends, each extending along 1 axis, improve the strength in the direction perpendicular to the axis Y* of the housing itself.

Furthermore, the inner surfaces of the openings OP1 and OP2 are set so that the dimensions of the openings increase as they approach the outer edge $1B_{P1}$ ($1B_{P2}$), and are inclined in the XZ cross-section. In this way, when moved in the Z-axis direction by gravitational force or by the force received when handled, the electrochemical element 1 contacts the inclined surfaces prescribed by the inner surfaces of these openings OP1 and OP2 and is restricted from further movement. That is, the inclined surface prevents degradation of the boundary BD between the outer edge $1B_{P2}$ ($1B_{P2}$) and the center portion 1C accompanying movement of the electrochemical element 1. Furthermore, the frames mentioned above can also be used for a laminated electric double-layer capacitor since the external structure is the same.

What is claimed is:

1. An electrochemical device, comprising:
   a first frame having first and second surfaces extending along two parallel axes respectively, the first and second surfaces each being bent around the axes respectively, and also having a pair of raised portions protruding in a thickness direction;
   a second frame having third and fourth surfaces opposing the first and second surfaces respectively; and
   a laminated electrochemical element having a housing encasing an element, an outer edge of the housing being situated between the first frame and the second frame, and a relative positional relationship between the first frame and the second frame being fixed,
   wherein a first portion of the outer edge of the housing is interposed between the first surface and the third surface, the first portion being bent along an interface between the first surface and the third surface, wherein a second portion of the outer edge of the housing is interposed between the second surface and the fourth surface, the second portion being bent along an interface between the second surface and the fourth surface, wherein an end of the housing abuts side surfaces of both of the raised portions, wherein a foil-like tab electrode extending from the end of the housing passes through a space between the raised portions and is electrically connected to an output terminal electrode fixed to the first frame, and wherein each of the bent parts of the first and second surfaces extends along the axes respectively so as to form raised ridges.

2. The electrochemical device according to claim 1, wherein a hook member is provided on one of the first frame and the second frame, an indentation engaging the hook member is provided on the other one of the first frame and the second frame, and the relative positional relationship between the first frame and the second frame is fixed by the hook.

3. The electrochemical device according to claim 1, wherein the third and fourth surfaces have grooves each extending along the axes respectively, and wherein the raised ridges are inserted into the grooves respectively.

* * * * *